Feb. 18, 1941.  J. H. EYNON  2,232,170
LUBRICATING MEANS FOR JOURNALS BETWEEN CONNECTING
ROD, CRANKSHAFT, AND PISTON OF GAS ENGINES
Filed Nov. 3, 1938
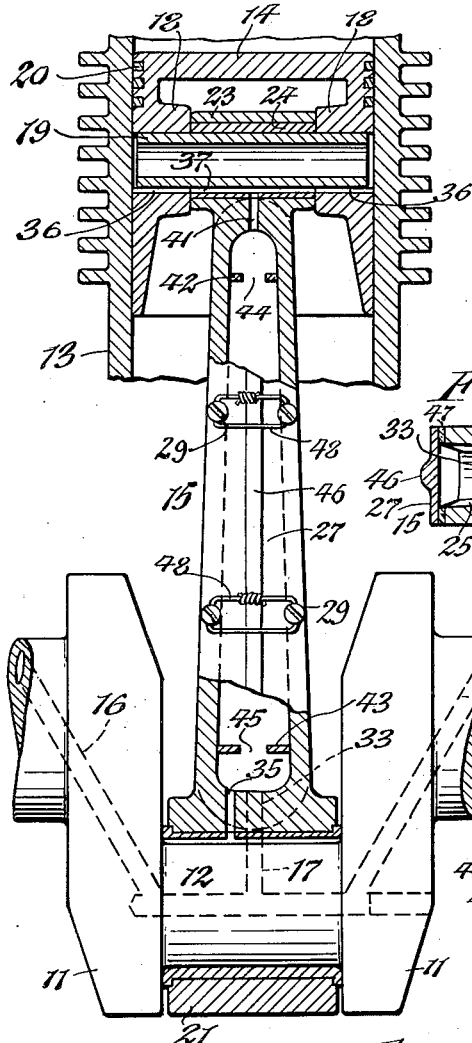
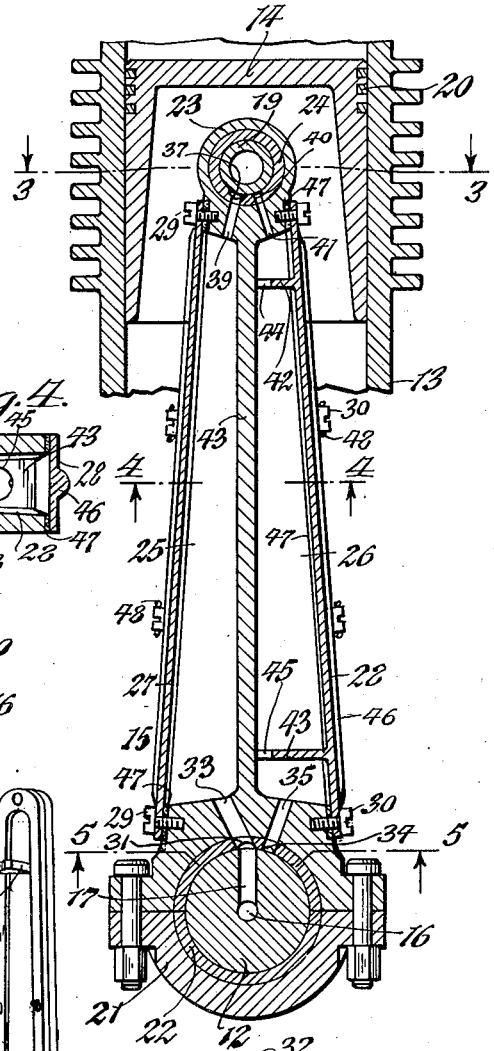
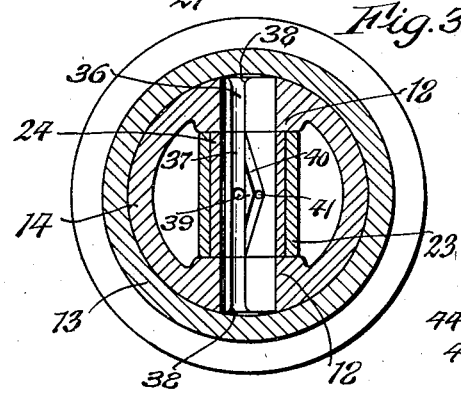
INVENTOR
James H. Eynon
BY
ATTORNEYS Patented Feb. 18, 1941

2,232,170

UNITED STATES PATENT OFFICE 2,232,170

LUBRICATING MEANS FOR JOURNALS BETWEEN CONNECTING ROD, CRANKSHAFT, AND PISTON OF GAS ENGINES

James H. Eynon, Brooklyn, N. Y.

Application November 3, 1938, Serial No. 238,589

2 Claims. (Cl. 184—6)

This invention relates to improvements in means for lubricating the pivotal connection between one end of a connecting rod and a crankshaft and also lubricating the pivotal connection at the opposite end of the connecting rod with a piston of a gas engine.

The general principles of this invention are shown and described in Letters Patent of the United States No. 2,005,028 granted June 18, 1935 to James H. Eynon and the present construction is designed to render the lubrication more efficient in operation and permit of embodying this improvement in engines having connecting rods of the type now in general use.

In the accompanying drawing:

Fig. 1 is a vertical longitudinal section showing this improved lubricating means applied to a connecting rod, crankshaft and piston of a gas engine.

Fig. 2 is a transverse section of the same.

Figs. 3, 4, and 5 are horizontal sections taken on lines 3—3, 4—4, and 5—5, respectively, in Fig. 2.

Fig. 6 is a perspective view of the cover plate of the grease chamber which is provided on its inner side with baffles.

Although this invention is capable of use in gas engines which may be variously organized so far as their detailed construction is concerned, those parts of the engine which are shown in the drawing as an example of one suitable for utilizing these improvements comprise a crank shaft 10 which is provided with a pair of crank arms 11, 11 extending laterally from the shaft and connected at their outer ends by means of a crank or wrist 12, a cylinder 13 arranged at the side of the shaft, a piston 14 reciprocating in the cylinder, and a connecting rod 15 which is pivotally connected at one end with the wrist of the crankshaft while its opposite end is pivotally connected with the piston 14. A fluid lubricant or oil is supplied to the periphery of the wrist 12 in the usual manner by means of an oil duct 16 formed in the crankshaft, crank arms and wrist 12 and provided with a lateral discharge passage 17 which extends radially from that part of the oil passage in the wrist 12 to the periphery of the latter, as shown in Figs. 1 and 2. The piston 14 is provided on its diametrically opposite sides with hubs 18 which receive opposite ends of a hollow or tubular piston pin 19 and adjacent to its face this piston is provided with a plurality of piston rings 20.

The connecting rod is provided at one end with a split eye 21 in which is mounted a split bushing 22 which surrounds the crank wrist 12 and forms a bearing therefor. At its opposite end the connecting rod is provided with a bearing eye 23 which contains a tubular bushing 24 surrounding the piston pin 19 between its hubs 18.

In a plane at right angles to the crankshaft the connecting rod is provided on its opposite sides with two chambers, one of which 25 is adapted to contain a lubricating oil or fluid and the other 26 is adapted to contain a semi-liquid or grease lubricant. The outer sides of these two lubricant chambers are closed respectively by cover plates 27, 28 preferably made of sheet aluminum which may be secured to the connecting rod by screws 29, 30 as shown in Figs. 1 and 2, or by any other suitable means.

In its bore the bushing 22 of the wrist eye 21 is provided with a longitudinal distributing groove 31 which is flaring or of bell mouth shape at its opposite ends, as shown at 32 in Fig. 5, and from the central part of this distributing groove 31 an inlet passage or port 33 extends through the adjacent part of the bushing 22 and the lower part of the wrist eye 21 into the lower end of the oil chamber 25. On one side of this main distributing passage 31 the bore of the bushing 22 in the wrist eye is also provided with an emergency supply groove 34 which is substantially of V-shape and opens at its opposite ends into the main distributing groove between the central part thereof and the outer bell-shaped ends of the same, as shown in Fig. 5. From the central part of this emergency groove 34 an emergency passage 35 extends through the adjacent part of the bushing 22 and the crank wrist 12 into the lower end of the grease chamber 26.

In the lower parts of the bore of the two piston hubs 18, the same are provided with its longitudinal distributing grooves 36 and the inner ends of these are adapted to register with a lubricant distributing groove 37 in the lower part of the bore of the piston pin bushing 19, as shown in Fig. 1, the outer ends of the grooves 36 being flared or of bell mouth shape, as shown at 38 in Fig. 3. From the central part of the distributing groove 37 in the piston pin bushing an oil distributing passage 39 extends through the adjacent part of the piston pin bushing and the upper piston eye of the connecting rod into the upper end of the oil chamber 25, as shown in Fig. 2.

Adjacent to one side of the main distributing passage 37 in the bushing of the piston pin eye is arranged an upper emergency groove 40 which is preferably of V-shape and communicates at its opposite ends with the lubricating groove 37 while its central part communicates with the upper end of the grease chamber by means of a passage 41 extending through the piston pin bushing and the piston pin bearing eye of the connecting rod, as shown in Figs. 1 and 2.

On its inner side the cover 28 of the grease chamber is provided adjacent to its upper and lower ends with baffles 42, 43 which are preferably formed integrally with this cover plate and extend inwardly therefrom into engagement with a partition 43 of the connecting rod which separates the oil and grease chambers but these baffles are provided with notches 44, 45 so that the spaces on opposite sides of these baffles are in communication with each other.

*Operation*

In the use of this improved lubricating system the grease chamber 26 is filled with a high-resisting semi-liquid grease compound which is held in reserve therein for subsequent emergency use, and during normal conditions a fluid lubricant such as oil is forced by the usual means into the supply passage 16 in the crankshaft from which it passes through the branch port 17 in the wrist 12, thence through the port 33 in the crank eye of the connecting rod and into the oil chamber 25, thence through the port 39 of the piston eye of the connecting rod into the grooves 37 and 36 in the piston pin bushing and the hubs of the piston and thence against the wall of the cylinder. Part of the liquid lubricant also passes from the crank wrist port 17 into the groove 31 of the bushing 22 and escapes from the bell mouth ends 32 thereof. The oil or liquid lubricant entering the groove 31 of the bushing 22 operates to lubricate the cooperating bearing surfaces between the bushing 22 and the crank wrist 12 while the oil entering the groove 37 of the piston pin bushing 24 operates to lubricate the cooperating bearing surfaces between the piston pin and the piston eye of the connecting rod, and the oil escaping from the opposite bell mouth ends 38 of the grooves 36 in the hubs of the piston is delivered against the bore of the cylinder and is distributed over the inner side of the cylinder by the piston rings 20, thereby lubricating the cooperating surfaces between the piston and cylinder.

So long as the oil or liquid lubricant is under normal pressure, the semi-liquid grease which is present in the grease chamber 26 and the ports and passages connected with the opposite ends thereof will be held therein by the pressure to which the oil is subjected. When, however, the supply of oil or lubricating liquid ceases or becomes inadequate due either to pump failure, broken oil feed lines, or oil shortage, then the pressure which had previously held the semi-liquid lubricant or grease in the respective grooves 34, 40, and ports 35 and 41, and the grease chamber 26 connected therewith will be reduced or eliminated altogether, thereby permitting the semi-liquid lubricant or grease to flow from the grease chamber 26 through the ports 35 and 41 and the grooves 34 and 40 into the main distributing grooves 31, 37 and 36 and thereby replace the usual oil for lubricating the bearing surfaces between the connecting rod and the crankshaft and piston. While being lubricated by liquid oil, the semi-liquid lubricant or grease in the chamber 26 is prevented from surging back and forth during the reciprocation of the connecting rod by means of baffles 42 and 43 and thereby preventing this emergency lubricant supply means from interfering with the operation of the oil lubricating system while the latter is functioning normally.

The volume of the supply of oil flow by this method can readily be predetermined and the requirements of the motor adjusted by increasing or diminishing the diameter of the ports or holes connecting the lubricating chambers with the grooves in the bushings and thereby establishing positive lubricating control.

So long as oil is contained in the grooves 31, 37 it is impossible for the grease lubricant compound to escape from the chamber 26 inasmuch as there is no room for the grease lubricant in these grooves while the latter are filled with oil. When, however, the oil is absent from these grooves or a deficiency of the same occurs therein, the semi-liquid lubricant compound will escape from the chamber 26 and fill the distributing grooves in the bushings 19 and 22 and serve to lubricate the respective bearing surfaces in place of the oil. This method of applying a lubrication by means of oil and a grease compound through these two separate chambers is therefore automatic in its action and provides a main lubricating system which functions under normal conditions and also an auxiliary or emergency lubrication without any appreciable additional cost in the manufacture of the several parts which form the elements of the engines as now manufactured.

For the purpose of strengthening the plates 27 and 28 and preventing the same from becoming distorted each of these plates may be provided on its outer side with a longitudinal strengthening rib 46, and to insure a leak tight joint between these plates and the surfaces on the connecting bar with which they engage a felt gasket or packing strip 47 is interposed between the marginal parts of each of these plates and the connecting bar. The number of fastening screws 29 and 30 which are employed for securing these plates to the connecting rod will, of course, be sufficient to firmly press these plates against the connecting rod and any suitable means may be provided for preventing these screws from becoming loose, such for example, as the wires 48 which are passed through pairs of these screws and are twisted together so as to serve as nut or screw locks, as shown in Fig. 1.

By the use of these improvements in a gas engine many accidents resulting in the loss of life and property will be averted and safety in air travel particularly will be increased inasmuch as it has been difficult heretofore, if not impossible, to correct any lubricating difficulties while in flight.

I claim as my invention:

1. A connecting rod provided with a bearing eye at one end adapted to receive the wrist of a crankshaft, a bearing eye at its opposite end adapted to receive the pivot pin of a piston, lubricant chambers arranged on opposite sides of the rod and adapted to receive liquid and grease lubricants, respectively, and ports leading from said chambers to said bearing eyes, plates secured to the opposite sides of said rod and forming the outer walls of said chambers, and baffle means arranged within one of said chambers for preventing surging of the lubricant therein and consisting of projections formed integrally with one of said plates on the inner side thereof and extending into the respective chamber.

2. A connecting rod provided with a bearing eye at one end adapted to receive the wrist of a crankshaft, a bearing eye at its opposite end adapted to receive the pivot pin of a piston, lubricant chambers arranged on opposite sides of the rod and adapted to receive liquid and grease lubricants, respectively, and bushings arranged in said eyes and each provided in its bore with a main longitudinal groove which communicates between its ends with the adjacent end of the liquid lubricant chamber and also with an emergency groove which leads at its ends to said main groove adjacent to opposite ends of the latter and also communicates with the adjacent end of the grease lubricant chamber.

JAMES H. EYNON.